Nov. 23, 1943.  H. J. KAUTH  2,334,710

INSULATED ELECTRICAL CONDUCTOR

Filed June 16, 1938

INVENTOR.

Henry J. Kauth

BY George J. Schottler

ATTORNEY.

Patented Nov. 23, 1943

2,334,710

UNITED STATES PATENT OFFICE 2,334,710

INSULATED ELECTRICAL CONDUCTOR

Henry J. Kauth, Rome, N. Y., assignor to General Cable Corporation, New York, N. Y., a corporation of New Jersey Application June 16, 1938, Serial No. 213,963

6 Claims. (Cl. 174—121)

This invention relates to a method of forming heat-resistant, non-flammable, moisture-resistant, insulating, flexible bodies, particularly adapted for use as insulating and protecting jackets for electrical conductors, and to the article produced, and has for an object the provision of improvements in this art.

For a long time there has been a great need for a substance which was suitable for impregnating fibrous bodies to make them heat-resistant, flame-resistant, and moisture-resistant, and which itself was a good electrical insulator and flexible in use, both when applied and after continued exposure to high temperatures.

Heretofore the principal inorganic materials which have been used as saturants were the soluble silicates. Their use has been known to the industry for a long time. Solutions of soluble silicates dry out to give transparent films which are heat resistant, but they are neither flexible nor water-resistant. To obtain a higher degree of water-resistance the soluble silicates may be treated with heavy metal salts, but this is at a sacrifice of the coherence of the gel, and the material still is not flexible when dry.

According to the present invention this need is satisfied by saturating the fibrous material with a heat-proof, flame-proof, moisture-resistant plastic which is preponderantly or entirely inorganic and which is flexible in its final condition. As a specific embodiment the invention comprehends suitably treating and applying a partially polymerized inorganic substance which after application is further polymerized to form an insoluble, flame-resistant, infusible, moisture-resistant, flexible insulation. One substance which has proved particularly satisfactory for this purpose is nitrogen chloro phosphide (PNCl$_2$)$_x$, commonly called phosphorus nitrile chloride. This substance itself is well known but has never been employed for the purposes of the present invention, so far as is known. The other halo phosphides of nitrogen, that is, the bromo, fluoro and iodo compounds, have similar structural characteristics and may also be used, but these substances are not so commonly known as is nitrogen chloro phosphide. The requirements are for a flexible inorganic, moisture-resistant plastic with a fusing point higher than 600° F.

Nitrogen chloro phosphide polymers, at present preferred, are made by the thermal polymerization of nitrogen chloro phosphide. They contain phosphorus, nitrogen and chlorine; contain no carbon or carbon-containing radicals, i. e., they are 100% inorganic; are tough and rubber-like; and have high heat, flame, water and solvent resistance.

According to one satisfactory method, nitrogen chloro-phosphide is heated for approximately one-half hour at 180°–250° C. to partially polymerize it. The temperature may be higher or lower than the range given, depending on the period of heating. The action is such as to produce a viscous oil when cool.

The substance at this stage is dissolved in a suitable solvent. One solvent which has been found satisfactory is an aromatic hydrocarbon, such as benzol.

The fibrous body is saturated with this solution and the solvent removed by evaporation.

Then the substance remaining in the fibrous body is heated to further polymerize it. The heating operation is subject to certain variations, largely depending on the type of structure which is to be treated. For a conductor which contains no elements which are injured by high heat the body may be heated to approximately 180°–200° C. for 15 minutes to provide the desired further polymerization of the saturant. If rubber or other substances subject to injury by heat at this temperature are involved the body may be heated for a longer time at a lower temperature, say for 20 minutes at 130° C.

While this saturant is useful for a wide variety of purposes because it is heat-resistant itself and increases the heat resistance of the body saturated with it, it is particularly useful in connection with fibrous bodies which are themselves highly resistant to heat.

For example, asbestos and glass fiber are inorganic substances which are capable of withstanding very high temperatures. Asbestos fiber has been used for a considerable time as a jacketing material for electrical conductors and glass fiber is now coming into general use for this purpose.

But the full value of these materials has not been realized because the saturants which have been used with them have not been sufficiently resistant to heat. A saturant is required to make the body water-resistant and this saturant, like the fibrous body, must be flexible. Without a saturant the fibrous bodies would absorb or adsorb moisture and this would condense and accumulate in the voids of the body, destroying its insulating value.

To minimize or eliminate the deteriorating effect of water, various resins, oils, waxes, lacquers, etc., have been used as saturants in such insulating coatings. These materials are all of an organic nature and do not possess heat resistance which is at all comparable to that of the inorganic fibrous coverings with which they are used. Consequently their use partially defeats the purpose of using the heat-stable inorganic insulation because the performance or operating limit of the entire structure is fixed by the saturants and not by the more stable inorganic materials.

The present invention provides a saturant which is heat-resistant in the same order as the inorganic fibrous bodies themselves and consequently when the saturant is used with such bodies it raises the heat resistance of the entire structure to the range of the fibrous body. Besides, the saturant hereby provided has the flexibility, moisture-resistance and insulating properties required of saturants for this purpose.

Several forms of electrical conductors embodying the invention are shown in the accompanying drawing, wherein.

Figure 1:
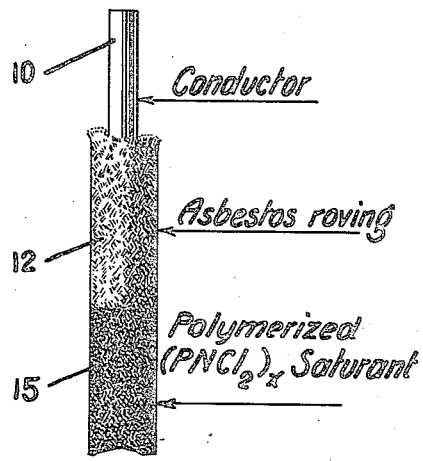
Fig. 1 is a side view of a conductor insulated with asbestos roving saturated with a benzol solution of partially polymerized nitrogen chloro phosphide $(PNCl_2)_x$ and baked at 180°–200° C. for 15 minutes.
Figure 2:
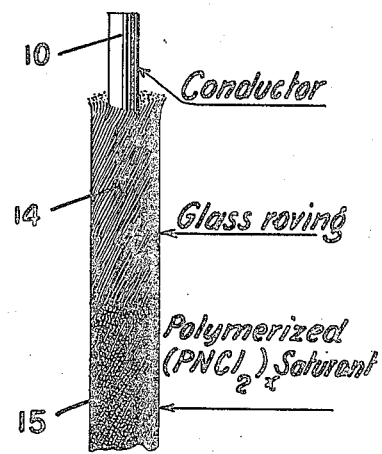
Fig. 2 is a side view of a conductor insulated with glass roving saturated with the same substance and treated in the same way.
Figure 3:
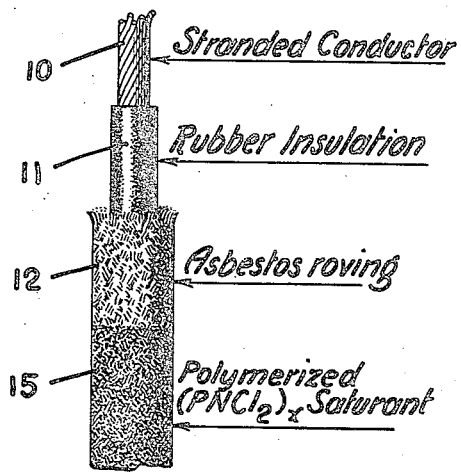
Figure 4:
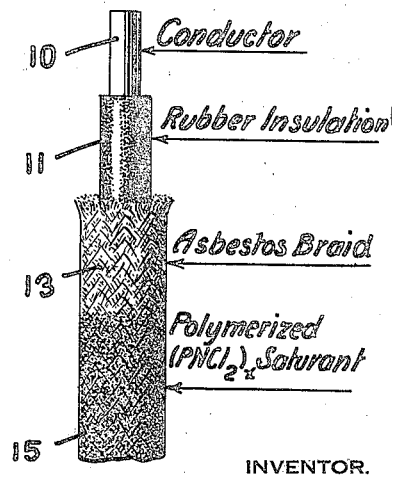

Fig. 3 is a side view of a stranded conductor insulated with a flexible material such as rubber and over this with an asbestos roving saturated with a benzol solution of partially polymerized nitrogen chloro phosphide $(PNCl_2)_x$ and baked at 130° C. for 20 minutes; and Fig. 4 is a side view of a conductor insulated with material such as rubber and over this with an asbestos braid saturated and treated like the cable shown in Fig. 3.

In the various figures wherein the outer coverings are cut away successively to show the structure underneath, the numeral 10 represents the conductor, 11 the rubber or other jacket, 12 the asbestos roving, 13 the asbestos braid, 14 the glass roving and 15 the saturant.

Instead of partially polymerizing nitrogen chloro phosphide (or other suitable material) and dissolving it in a solvent before applying it to the fibrous material, it may be initially applied to the fibrous material and polymerized therein by heating the entire structure to the extent desired as one continuous operation. While this alternative method may have some advantages for some purposes, the preferred method of polymerizing in stages and the use of a solution of the partially polymerized material has several advantages.

First, the partially polymerized material from the solution continues to polymerize slowly to the rubbery condition even at room temperatures and polymerizes quite rapidly at moderately high temperatures such as can be conveniently used for heating most wires. This is not true of material which has not been partially polymerized. Again, the partially polymerized material can be applied and heated in a continuous operation, and even if the ultimate degree of polymerization is not obtained in the heating oven, no particular trouble ensues because of the spontaneous polymerization which continues until the material is in its final state. The material which has not had the preliminary polymerization does not behave in this way, but remains in the original condition indefinitely unless heated to a high temperature for a considerable time. Moreover, during the early stages of heating to polymerize, a considerable amount of acrid fumes is given off and these are best eliminated in equipment intended for the purpose instead of in the ovens used for baking wire.

The insulated conductor constructions shown in the drawing are illustrative merely, and it will be understood that either the inorganic polymerized material alone or with the inorganic fibers may be used with other types of conductors or other structures wherein it is desired to obtain greater heat resistance, water-resistance, flame-resistance, flexibility, etc. For example, the saturant may be used with varnished cambric or with organic synthetic resin plastic insulations. However, the simple embodiment of a conductor and insulation of completely inorganic material gives a construction not heretofore available and makes possible the insulation of conductors for use in a temperature range which is impracticable with any existing insulation. The need for such conductors has existed for many years and insulation of glass or porcelain beads for high temperatures has been used to some extent, but obviously does not provide all the advantages of the present invention. Like glass and asbestos fibers, the glass or porcelain bead construction provides insulation and heat resistance, but does not provide moisture-resistance. And while the glass and asbestos fibers also provide flexibility, they do not provide moisture-resistance; and if saturated with materials heretofore known, they char at low temperatures and lose their flexibility as well as their moisture-resistance.

The material is not limited to use with fibrous jackets applied to conductors, but may be used with fibrous tubes or sleeves which may be placed over conductors of common construction which require higher flame-resistance and heat-resistance or these combined with water-resistance. Or the material may be combined with a tape which is wrapped over a conductor or other body. Moreover, fibrous material combined with the specified filler material may be used for many purposes other than those associated with electrical conductors.

It will be understood that the invention may be variously embodied within the limits of the prior art and the scope of the subjoined claims.

I claim:

1. In an insulated electrical conductor, in combination with a conductor core, of a flexible non-inflammable, moisture-resistant jacket over the conductor core, said jacket comprising a layer of inorganic fibres and a saturant of polymerized nitrogen halo phosphide for said layer, said saturant being infusible below 600° F. and remaining flexible under normal working temperature.

2. In an insulated electrical conductor, in combination with a conductor core, of a flexible non-inflammable, moisture-resistant jacket over the conductor core, said jacket comprising a layer of inorganic fibres and a saturant of polymerized nitrogen halo phosphide for said layer, said saturant being soluble in organic solvents, and infusible below 600° F. and remaining flexible under normal working temperature.

3. In an insulated electrical conductor, in combination with a conductor core, of a flexible non-inflammable, moisture-resistant jacket over the conductor core, said jacket comprising a layer of inorganic fibres and a saturant of polymerized nitrogen chloro-phosphide for said layer, said saturant being infusible below 600° F.

and remaining flexible under normal working temperature.

4. In an insulated electrical conductor, in combination with a conductor core, of a flexible non-inflammable, moisture-resistant jacket over the conductor core, said jacket comprising a layer of inorganic fibres and a saturant of polymerized nitrogen chloro-phosphide for said layer, said saturant being soluble in an aromatic hydrocarbon and infusible below 600° F. and remaining flexible under normal working temperature.

5. In an insulated electrical conductor, in combination with a conductor core, of a flexible non-inflammable, moisture-resistant jacket over the conductor core, said jacket comprising a layer of asbestos fibres and a saturant of polymerized nitrogen halo phosphide for said layer, said saturant being infusible below 600° F. and remaining flexible under normal working temperature.

6. In an insulated electrical conductor, in combination with a conductor core, of a flexible non-inflammable, moisture-resistant jacket over the conductor core, said jacket comprising a layer of glass fibres and a saturant of polymerized nitrogen halo phosphide for said layer, said saturant being infusible below 600° F. and remaining flexible under normal working temperature.

HENRY J. KAUTH.